US012267731B2

(12) United States Patent
Wang et al.

(10) Patent No.: US 12,267,731 B2
(45) Date of Patent: Apr. 1, 2025

(54) METHOD AND DEVICE FOR RESOURCE COORDINATION

(71) Applicant: GUANGDONG OPPO MOBILE TELECOMMUNICATIONS CORP., LTD., Guangdong (CN)

(72) Inventors: Shukun Wang, Dongguan (CN); Yang Xu, Dongguan (CN)

(73) Assignee: GUANGDONG OPPO TELECOMMUNICATIONS CORP., LTD., Guangdong (CN)

( * ) Notice: Subject to any disclaimer, the term of this patent is extended or adjusted under 35 U.S.C. 154(b) by 371 days.

(21) Appl. No.: 17/670,138

(22) Filed: Feb. 11, 2022

(65) Prior Publication Data
US 2022/0167213 A1 May 26, 2022

Related U.S. Application Data

(63) Continuation of application No. PCT/CN2019/100170, filed on Aug. 12, 2019.

(51) Int. Cl.
*H04W 28/26* (2009.01)
*H04W 8/18* (2009.01)
(Continued)

(52) U.S. Cl.
CPC ........... *H04W 28/26* (2013.01); *H04W 8/183* (2013.01); *H04W 24/10* (2013.01); *H04W 68/005* (2013.01); *H04W 36/08* (2013.01)

(58) Field of Classification Search
CPC ..... H04W 28/26; H04W 8/183; H04W 24/10; H04W 68/005; H04W 68/12; H04W 8/22;
(Continued)

(56) References Cited

U.S. PATENT DOCUMENTS

2012/0190362 A1 7/2012 Subbarayudu
2012/0314610 A1 12/2012 Hou
(Continued)

FOREIGN PATENT DOCUMENTS

CN 101951635 A 1/2011
CN 102090132 A 6/2011
(Continued)

OTHER PUBLICATIONS

"3rd Generation Partnership Project; Technical Specification Group Radio Access Network; Radio Resource Control (RRC); Protocol specification (Release 15)", 3GPP TS 25.331, vol. Ran WG6, No. V15.4.0, Sep. 21, 2018 (Sep. 21, 2018), entire document.
(Continued)

*Primary Examiner* — Hardikkumar D Patel
(74) *Attorney, Agent, or Firm* — Ladas & Parry, LLP

(57) ABSTRACT

A method and device for resource coordination are provided. The method comprises an operation as follows. A terminal device sends a first request message to a network device to which a first subscriber identity card is connected. The first request message is used for requesting the network device to configure or reserve a first resource, and the terminal device having the first subscriber identity card and a second subscriber identity card.

17 Claims, 8 Drawing Sheets

100

(51) Int. Cl.
    *H04W 24/10*     (2009.01)
    *H04W 68/00*     (2009.01)
    *H04W 36/08*     (2009.01)

(58) Field of Classification Search
    CPC ..... H04W 36/08; H04W 76/16; H04W 76/27; H04W 36/0088; H04W 48/14; H04W 88/06
    See application file for complete search history.

(56) References Cited

U.S. PATENT DOCUMENTS

| | | | |
|---|---|---|---|
| 2014/0248922 A1* | 9/2014 | Josso | H04W 60/005 455/552.1 |
| 2015/0312787 A1 | 10/2015 | Das et al. | |
| 2017/0086100 A1 | 3/2017 | Sagar et al. | |
| 2017/0347294 A1 | 11/2017 | Sagar et al. | |
| 2018/0084504 A1 | 3/2018 | Lindoff et al. | |
| 2019/0253945 A1* | 8/2019 | Paladugu | H04W 12/033 |
| 2021/0029652 A1* | 1/2021 | Li | H04W 52/365 |
| 2021/0298108 A1* | 9/2021 | Wu | H04W 56/0055 |

FOREIGN PATENT DOCUMENTS

| | | | |
|---|---|---|---|
| CN | 103583072 A | 2/2014 | |
| CN | 106332301 A | 1/2017 | |
| CN | 107635266 A | 1/2018 | |
| CN | 109076453 A | 12/2018 | |
| CN | 109792660 A | 5/2019 | |

OTHER PUBLICATIONS

Supplementary Partial European Search Report in the European application No. 19941559.7, mailed on Jul. 26, 2022.
Written Opinion of the International Search Authority in the international application No. PCT/CN2019/100170, mailed on May 12, 2020.
"3rd Generation Partnership Project; Technical Specification Group Radio Access Network; NR; Requirements for support of radio resource management (Release 17)", 3GPP TS 38.133 V17.6.0 (Jun. 2022), entire document.
"3rd Generation Partnership Project; Technical Specification Group Radio Access Network; NR; Radio Resource Control (RRC) protocol specification; (Release 17)", 3GPP TS 38.331 V17.1.0 (Jun. 2022), entire document.
"3rd Generation Partnership Project; Technical Specification Group Radio Access Network; NR; NR and NG-RAN Overall Description; Stage 2 (Release 17)", 3GPP TS 38.300 V17.1.0 (Jun. 2022), entire document.
International Search Report in the international application No. PCT/CN2019/100170, mailed on May 12, 2020.
Intel, Qualcomm, "Use Case: Support Mobile Terminated Services for Multi-USIM Devices", 3GPP TSG-SA WG1 Meeting #86 S1-191019, Suzhou, China, May 6-10, 2019, entire document.
Written opinion of the international searching authority in the international application No. PCT/CN2019/100170, mailed on May 12, 2020 and English translation provided by Google Translate.
Supplementary European Search Report in the European application No. 19941559.7, mailed on Oct. 26, 2022.
First Office Action and search report of the corresponding Chinese application No. 201980094658.4, issued on Mar. 26, 2024, with search report, 20 pages with English translation.
Second Office Action of the corresponding Chinese application No. 201980094658.4, issued on Oct. 31, 2024, 10 pages with English translation.

* cited by examiner

A terminal device sends a first request message to a network device to which a first subscriber identity card is connected, the first request message is used to request the network device to configure or reserve a first resource, and the terminal device has the first subscriber identity card and a second subscriber identity card — 201

FIG. 2

A terminal device sends a second request message to a network device to which a first subscriber identity card is connected, the second request message is used to request the network device to lower a terminal device capability for the terminal device — 301

FIG. 3

METHOD AND DEVICE FOR RESOURCE COORDINATION

CROSS-REFERENCE TO RELATED APPLICATIONS

This is a continuation application of International Patent Application No. PCT/CN2019/100170, filed on Aug. 12, 2019, the disclosure of which is hereby incorporated by reference in its entirety.

BACKGROUND

At present, the capability of a terminal device generally does not support pure dual connectivity. Dual connectivity refers to dual uplink and dual downlink (Dual UL/DL), that is, the terminal device simultaneously transmits uplink data service and downlink data service on two networks through two subscriber identity cards. Although the terminal devices do not support dual connectivity currently, it is a trend to implement dual connectivity in future development of the terminal device. However, a problem of resource sharing and allocation between two subscriber identity cards exists if the dual connectivity is implemented in the terminal device.

SUMMARY

The embodiments of the present disclosure relate to the field of mobile communication technologies, and in particular to a method and device for resource coordination.

A first aspect of the present disclosure provides the method for resource coordination, which includes an operation as follows.

A terminal device sends a first request message to a network device to which a first subscriber identity card is connected. The first request message is used to request the network device to configure or reserve a first resource. The terminal device has the first subscriber identity card and a second subscriber identity card.

A second aspect of the present disclosure provides the method for resource coordination, which includes an operation as follows.

A terminal device sends a second request message to a network device to which a first subscriber identity card is connected. The second request message is used to request the network device to lower a terminal device capability of the terminal device.

A third aspect of the present disclosure provides the device for resource coordination, which includes a processor, an input interface; an output interface, and a memory configured to store a computer program. The processor is configured to invoke and execute the computer program stored in the memory to control the output interface to send a first request message to a network device to which a first subscriber identity card is connected. The first request message is used to request the network device to configure or reserve a first resource, and a device has the first subscriber identity card and a second subscriber identity card.

BRIEF DESCRIPTION OF THE DRAWINGS

The drawings described herein are intended to provide a further understanding of the present disclosure and constitute a part of the present disclosure. The illustrative embodiments of the present disclosure and the description thereof are intended to explain the present disclosure and do not constitute an improper limitation of the present disclosure. In the drawings:

FIG. 2 is a first flowchart of a method for resource coordination according to an embodiment of the present disclosure;

FIG. 3 is a second flowchart of a method for resource coordination according to an embodiment of the present disclosure;

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
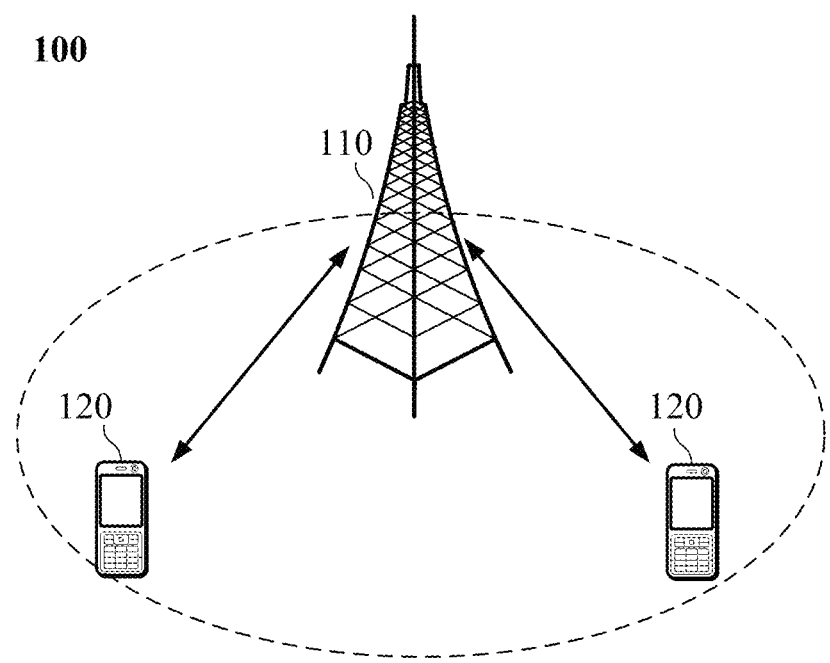
FIG. 1 is a schematic diagram of architecture of a communication system according to an embodiment of the present disclosure.

Exemplarily, a communication system 100 to which the embodiment of the present disclosure is applied is illustrated in FIG. 1. The communication system 100 may include a network device 110, which may be a device that communicates with a terminal 120 (or referred to as a communication terminal, a terminal). The network device 110 may provide communication coverage for a particular geographic area and may communicate with terminals located within the coverage area. Alternatively, the network device 110 may be a Base Transceiver Station (BTS) in a GSM system or a CDMA system, may be a NodeB (NB) in a WCDMA system, may be an Evolutional Node B (eNB or eNodeB) in an LTE system, or may be a radio controller in a Cloud Radio Access Network (CRAN), or may be a mobile switching center, a relay station, an access point, a vehicle-mounted device, a wearable device, a hub, a switch, a bridge, a router, a network-side device in a 5G network, a network device in a future evolved Public Land Mobile Network (PLMN), or the like.

The communication system 100 also includes at least one terminal 120 located within coverage of the network device 110. As used herein, the "terminal" includes, but is not limited to be connected: via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, a AM-FM broadcast transmitter; and/or means of another terminal arranged to receive/transmit communication signals; and/or an Internet of Things (IoT) device. The terminal configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, facsimile, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal may refer to an access terminal, User Equipment (UE), a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal in a 5G network, a terminal in the future evolved PLMN, or the like.

Alternatively, Device to Device (D2D) communication may be performed between the terminals 120.

Alternatively, a 5G system or 5G network may also be referred to as a New Radio (NR) system or an NR network.

FIG. 1 exemplarily illustrates a network device and two terminals. Alternatively, the communication system 100 may include a plurality of network devices and other numbers of terminals may be included within a coverage area of each network device, which are not limited in the embodiments of the present disclosure.

Alternatively, the communication system 100 may further include other network entities such as a network controller, a mobility management entity, which are not limited by the embodiments of the present disclosure.

It should be understood that a device having a communication function in a network/system in the embodiments of the present disclosure may be referred to as a communication device. As an example of the communication system 100 illustrated in FIG. 1, the communication device may include a network device 110 and a terminal 120 having a communication function. The network device 110 and the terminal 120 may be specific devices described above, and details are not described herein. The communication device may also include other devices in the communication system 100, such as network controllers, mobility management entities, and other network entities, which are not limited in the embodiments of the present disclosure.

It should be understood that the terms "system" and "network" are used interchangeably herein. The term "and/or" in the disclosure means only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding of the technical solutions of the embodiments of the present disclosure, the related technologies of the embodiments of the present disclosure are described below. Any combination of the following related technologies and the technical solutions of the embodiments of the present disclosure will fall within the protection scope of the embodiments of the present disclosure.

UE State

For the purpose of reducing air interface signaling and rapidly recovering wireless connections and data services, a new Radio Resource Control (RRC) state, i.e., RRC_INACTIVE state is defined in the 5G. This state is different from the RRC_IDLE state and the RRC_ACTIVE state.

In the RRC_IDLE state (abbreviated as an idle state), mobility is a UE-based cell selection and reselection, paging is initiated by a Core Network (CN), a paging area is configured by the CN, and there is no UE context and no RRC connection on the base station side.

In the RRC_CONNECTED state (abbreviated as a connected state), there is an RRC connection and there is UE context on the base station side and the UE side, the network side knows that the location of the UE is at a specific cell level, mobility is mobility controlled by the network side, and unicast data may be transmitted between the UE and the base station.

In the RRC_INACTIVE state (abbreviated as inactive state), mobility is the UE-based cell selection and reselection, there is a connection between CN-NR, the UE context stored in a certain base station, paging is triggered by a Radio Access Network (RAN), an RAN-based paging area is managed by the RAN, and the network side knows that the location of the UE is based on a paging area level of the RAN.

Dual-Card Terminal Device

Dual-card dual-standby means that one terminal device can simultaneously load two subscriber identity cards, and the two subscriber identity cards are in a standby state. Dual-card dual-standby in the market generally refers to dual-card dual-standby of the same network standard, that is, dual-card dual-standby of GSM network, or dual-card dual-standby of CDMA network, etc. Dual-network dual-standby means that user identification cards of two different networks are inserted into a terminal device simultaneously and are both in the power-on state simultaneously. The user can make and receive calls, and send and receive short messages without switching networks.

At present, the capability of the terminal device generally does not support pure dual connectivity. Dual connectivity refers to dual uplink and dual downlink (Dual UL/DL), that is, the UE simultaneously transmit the uplink data service and the downlink data service on the two networks through two subscriber identity cards. In general, most of the current terminal devices only support Single UL/DL or Single UL/Dual DL, which means that the UEs can perform only services on one subscriber identity card at a certain time.

In 5G, one subscriber identity card of the dual cards may camp in the LTE cell, the other subscriber identity card may camp in the NR cell, or both the subscriber identity cards camp in the NR cell. On the other hand, the two subscriber identity cards may belong to the same operator or may belong to different operators.

Although terminal devices do not support dual connectivity currently, it is a trend to implement dual connectivity in future development of the terminal device However, if the dual connectivity is implemented in the terminal device, a problem of resource sharing and allocation between two subscriber identity cards exists, and also a problem of coexistence interference in the device exists due to simultaneous transmission of uplink signals. To this end, the following technical solutions of the embodiments of the present disclosure are proposed.

FIG. 2 is a first flowchart of a method for resource coordination according to an embodiment of the present disclosure. As shown in FIG. 2, the method for resource coordination method includes the following operation 201.

At 201, the terminal device sends a first request message to a network device to which a first subscriber identity card is connected. The first request message is used to request the network device to configure or reserve a first resource, and the terminal device has the first subscriber identity card and the second subscriber identity card.

In the embodiment of the present disclosure, the terminal device may be any device capable of communicating with a network, such as a mobile phone, a tablet computer, a notebook, an in-vehicle terminal, or a wearable device.

In the embodiment of the present disclosure, the terminal device supports dual-card dual-standby. Specifically, two subscriber identity cards may be inserted into the terminal device, which are a first subscriber identity card and a second subscriber identity card, respectively. Networks in which the first subscriber identity card and the second subscriber identity card can camp may be the same type of network, or may be different types of networks. For example, the first subscriber identity card may camp in an LTE cell, the second subscriber identity card may camp in an NR cell, or both subscriber identity cards camp in an NR cell.

In the embodiment of the present disclosure, the first subscriber identity card and the second subscriber identity card may be both Subscriber Identification Module SIM) cards, or may be both Universal Subscriber Identity Module (USIM) cards, or one is the SIM card and the other is the USIM card. The types of the first subscriber identity card and the second subscriber identity card are not limited in the embodiment of the present disclosure.

It should be noted that a dual card is taken as an example in the solutions described in the embodiments of the present disclosure. The present disclosure is not limited thereto, and the technical solutions of the embodiments of the present disclosure are also applicable in the multi-card cases in the future. For example, three subscriber identity cards may be inserted into the terminal device, namely, a first subscriber identity card, a second subscriber identity card, and a third subscriber identity card.

In this embodiment of the present disclosure, the terminal device supports dual transmitting and dual receiving communication capability, that is, the first subscriber identity card and the second subscriber identity card can independently transmit uplink and downlink signals.

In the embodiment of the present disclosure, the first subscriber identity card is in a connected state, and the second subscriber identity card is in an idle state or an inactive state or a connected state.

For example, the terminal device include two USIM cards, USIM A and USIM B, respectively. USIM A is in the connected state and USIM B is in the idle or inactive state or connected state.

In this embodiment of the present disclosure, the terminal device sends the first request message to the network device to which the first subscriber identity card is connected, which is specifically implemented by the following operation. The terminal device sends the first request message to the base station to which the first subscriber identity card is connected through the first subscriber identity card. The first request message is used to request the network device to configure or reserve the first resource. Different implementations of the first resource are described below.

The first resource is a first measurement interval

After the terminal device sends the first request message to the network device to which the first subscriber identity card is connected, the terminal device receives configuration information of a first measurement interval mode sent by the network device, and determines the first measurement interval based on the configuration information of the first measurement interval mode. The first measurement interval is used by the terminal device to perform Radio Resource Management (RRM) measurement and paging reception of a cell in which the second subscriber identity card is located.

For example, the terminal device sends a first request message to a base station to which the USIM A is connected. The first request message is used to request the base station to configure a first measurement interval mode. The configuration information of the first measurement interval mode includes at least one of a period of the first measurement interval, a duration of the first measurement interval, or an offset of the first measurement interval. Within the first measurement interval, the terminal device may perform RRM measurement and paging reception of the cell in which the USIM B is located.

The first resource is at least one band or band group.

The first request message carries first indication information, and the first indication information indicates the at least one band or band group.

Further, optionally, in response to that the network device uses the at least one band or band group, the terminal device receives an RRC reconfiguration message sent by the network device. The RRC reconfiguration message is used by the terminal device to release usage of the at least one band or band group.

For example, the terminal device sends the first request message to the base station to which the USIM A is connected. The first request message carries first indication information, and the first indication information indicates the at least one band or band group. After the first indication information is received by the base station, it indicates that the base station can no longer use the at least one band or band group. In response to that the base station uses the at least one band or band group currently, the base station configures, through an RRC reconfiguration message, the terminal device to release the usage of the at least one band or band group.

It should be noted that the network device refers to a base station to which the first subscriber identity card is connected, and a first resource negotiated between the terminal device and the base station is used for the second subscriber identity card.

In an alternative implementation, in response to that a cell in which the first subscriber identity card is located is handed over from a first cell to a second cell, the terminal device sends the first request message to the first cell, and the first request message is forwarded by the first cell to the second cell.

For example, if the cell in which the USIM A is located is handed over (that is, changed), the original cell (that is, the first cell) in the handover sends the first request message of the terminal device to the target cell (that is, the second cell) in the handover, and the target cell configures or reserves the first resource according to the first request message.

In an alternative implementation, in response to that a cell in which the second subscriber identity card is located is handed over from the first cell to the second cell, the terminal device sends the first request message to the network device to which the first subscriber identity card is connected.

For example, if the cell in which the USIM B is located is handed over (i.e., changed), the terminal device is triggered to re-initiate the resource request process (i.e., the terminal device sends the first request message to the base station to which the USIM A is connected).

Further, in an alternative implementation, in response to that no first response message sent by the network device responsive to the first request message is received by the terminal device before a first time, the terminal device uses the first resource for the second subscriber identity card. The first time may be determined by any of the following manners.

In the first manner, the first time is determined based on a first timer

The terminal device starts the first timer after sending the first request message to the network device to which the first subscriber identity card is connected. In response to that no first response message sent by the network device responsive to the first request message is received by the terminal device before the first timer expires, the terminal device uses the first resource for the second subscriber identity card.

In the second manner, the first time is determined based on first time information for indicating at least one of a radio frame number, a subframe number, or a slot number.

In response to that no first response message sent by the network device responsive to the first request message is received by the terminal device before the first time determined based on the first time information, the terminal device uses the first resource for the second subscriber identity card.

According to the technical solution of the embodiments of the present disclosure, the dual connectivity function is realized in a scenario of dual subscriber identity cards (abbreviated as dual card), and the resource sharing between the two subscriber identity cards is clarified, thereby ensuring that the two subscriber identity cards can communicate simultaneously.

FIG. 3 is a second flowchart of a method for resource coordination according to an embodiment of the present disclosure. As shown in FIG. 3, the method for resource coordination includes the following operation 301.

At 301, the terminal device sends a second request message to a network device to which a first subscriber identity card is connected. The second request message is used to request the network device to lower a terminal device capability of the terminal device.

In the embodiment of the present disclosure, the terminal device may be any device capable of communicating with a network, such as a mobile phone, a tablet computer, a notebook, an in-vehicle terminal device, or a wearable device.

In the embodiment of the present disclosure, the terminal device supports dual-card dual-standby. Specifically, two subscriber identity cards may be inserted into the terminal device, which are a first subscriber identity card and a second subscriber identity card, respectively. Networks in which the first subscriber identity card and the second subscriber identity card can camp may be the same type of network, or may be different types of networks. For example, the first subscriber identity card may camp in an LTE cell, the second subscriber identity card may camp in an NR cell, or both subscriber identity cards camp in an NR cell.

In the embodiment of the present disclosure, the first subscriber identity card and the second subscriber identity card may be both SIM cards, or may be both USIM cards, or one is the SIM card and the other is the USIM card. The types of the first subscriber identity card and the second subscriber identity card are not limited in the embodiment of the present disclosure.

It should be noted that a dual card is taken as an example in the solutions described in the embodiments of the present disclosure. The present disclosure is not limited thereto, and the technical solutions of the embodiments of the present disclosure are also applicable in the multi-card cases in the future. For example, three subscriber identity cards may be inserted into the terminal device, namely, a first subscriber identity card, a second subscriber identity card, and a third subscriber identity card.

In this embodiment of the present disclosure, the terminal device supports dual transmitting and dual receiving communication capability, that is, the first subscriber identity card and the second subscriber identity card can independently transmit uplink and downlink signals.

In the embodiment of the present disclosure, the first subscriber identity card is in a connected state, and the second subscriber identity card is in an idle state or an inactive state or a connected state.

For example, the terminal device include two USIM cards, USIM A and USIM B, respectively. Where USIM A is in the connected state and USIM B is in the idle or inactive state or connected state.

In this embodiment of the present disclosure, the terminal device expects the base station to which the first subscriber identity card is connected to lower the terminal device capability, and sends a second request message to the base station. The second request message carries second indication information, and the second indication information indicates information about lowered terminal device capability of the terminal device or information about maximum terminal device capability of the terminal device under the network device.

In this embodiment of the present disclosure, the terminal device may report second indication information to the network device in any one of the following manners.

In the first manner, the terminal device sends third indication information to the network device. The third indication information is used to trigger the network device to initiate a terminal device capability request process. The terminal device receives a third request message sent by the network device. The third request message is used to request the terminal device to report terminal device capability information. The terminal device sends, to the network device, the second indication information carrying the information about lowered terminal device capability or the information about maximum terminal device capability of the terminal device under the network device.

In the second manner, the terminal device sends the second indication information carrying the information about lowered terminal device capability or the information about maximum terminal device capability of the terminal device under the network device to the network device.

Figure 4:
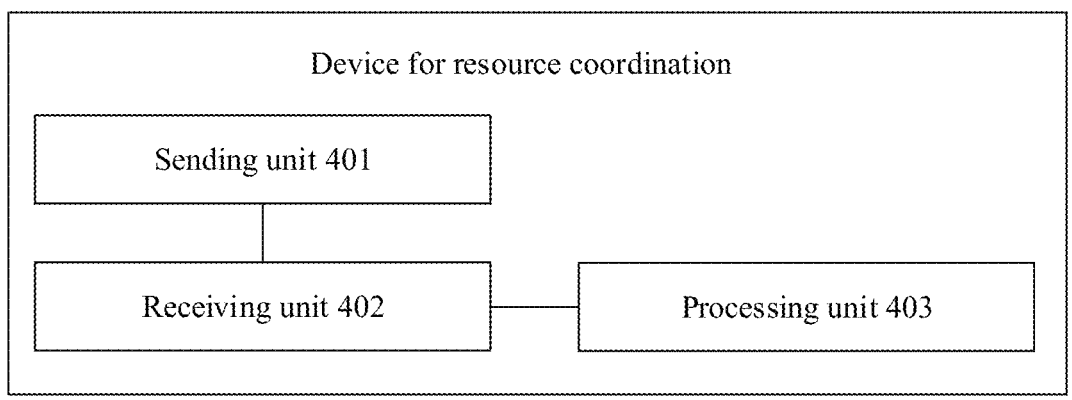
FIG. 4 is a first schematic structural diagram of a device for resource coordination according to an embodiment of the present disclosure.

FIG. 4 is a first schematic structural diagram of a device for resource coordination according to an embodiment of the present disclosure. The device for resource coordination is applied to a terminal device. As shown in FIG. 4, the device for resource coordination includes a sending unit 401.

The sending unit 401 is configured to send a first request message to a network device to which a first subscriber identity card is connected. The first request message is used to request the network device to configure or reserve a first resource, and a terminal device has the first subscriber identity card and a second subscriber identity card.

In an alternative implementation, the first resource is a first measurement interval.

The device further includes a receiving unit 402 configured to receive configuration information of a first measurement interval mode sent by the network device, and determine the first measurement interval based on the configuration information of the first measurement interval mode. The first measurement interval is used by the terminal device to perform RRM measurement and paging reception of a cell in which the second subscriber identity card is located.

In an alternative implementation, the configuration information of the first measurement interval mode includes at least one of a period of the first measurement interval, a duration of the first measurement interval, or an offest of the first measurement interval.

In an alternative implementation, the first resource is at least one band or band group, the first request message carries first indication information, and the first indication information indicates the at least one band or band group.

In an alternative implementation, the device further includes: a receiving unit 402 configured to receive an RRC reconfiguration message sent by the network device. The RRC reconfiguration message is used by the terminal device to release usage of the at least one band or band group.

In an alternative implementation, in response to that a cell in which the first subscriber identity card is located is handed over from a first cell to a second cell, the sending unit 401 sends the first request message to the first cell, and the first request message is forwarded by the first cell to the second cell.

In an alternative implementation, in response to that the cell in which the second subscriber identity card is located is handed over from a first cell to a second cell, the sending unit 401 sends the first request message to the network device to which the first subscriber identity card is connected.

In an alternative implementation, the device further includes: a processing unit 403 configured to use the first resource for the second subscriber identity card in response to that no first response message sent by the network device responsive to the first request message is received before a first time.

In an alternative implementation, the first time is determined based on a first timer.

The first timer is started after the sending unit 401 sends the first request message to the network device to which the first subscriber identity card is connected.

The processing unit 403 is configured to use the first resource for the second subscriber identity card in response to that no first response message sent by the network device responsive to the first request message is received before the first timer expires.

In an alternative implementation, the first time is determined based on first time information for indicating at least one of a radio frame number, a subframe number, or a slot number.

The processing unit 403 is configured to use the first resource for the second subscriber identity card in response to that no first response message sent by the network device responsive to the first request message is received before the first time determined based on the first time information.

In an alternative implementation, the first subscriber identity card is in a connected state, and the second subscriber identity card is in an idle state or an inactive state or a connected state.

It should be understood by those skilled in the art that the related descriptions of the device for resource coordination described above in the embodiments of the present disclosure may be understood with reference to the related descriptions of the method for resource coordination in the embodiments of the present disclosure.

Figure 5:
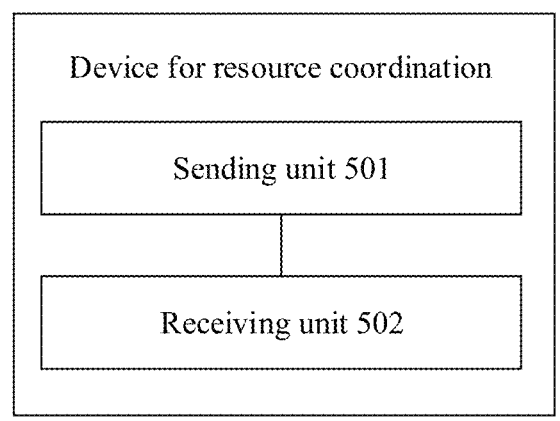
FIG. 5 is a second schematic structural diagram of a device for resource coordination according to an embodiment of the present disclosure.

FIG. 5 is a second schematic structural diagram of a device for resource coordination according to an embodiment of the present disclosure. The device for resource coordination is applied to a terminal device. As shown in FIG. 5, the device for resource coordination includes a sending unit 501 configured to send a second request message to a network device to which a first subscriber identity card is connected. The second request message is used to request the network device to lower a terminal device capability of the terminal device.

In an alternative implementation, the second request message carries second indication information, and the second indication information indicates information about lowered terminal device capability of the terminal device or information about maximum terminal device capability of the terminal device under the network device.

In an alternative implementation, the sending unit 501 is further configured to send third indication information to the network device. The third indication information is used to trigger the network device to initiate a terminal device capability request process.

The device further includes a receiving unit 502 configured to receive a third request message sent by the network device. The third request message is used to request the terminal device to report terminal device capability information.

The sending unit 501 is configured to send, to the network device, the second indication information carrying the information about lowered terminal device capability or the information about maximum terminal device capability of the terminal device under the network device.

In an alternative implementation, the sending unit 501 is configured to send, to the network device, the second indication information carrying the information about lowered terminal device capability or the information about maximum terminal device capability of the terminal device under the network device.

In an alternative implementation, the first subscriber identity card is in a connected state, and a second subscriber identity card is in an idle state or an inactive state or a connected state.

It should be understood by those skilled in the art that the related descriptions of the device for resource coordination described above in the embodiments of the present disclosure may be understood with reference to the related descriptions of the method for resource coordination in the embodiments of the present disclosure.

Figure 6:
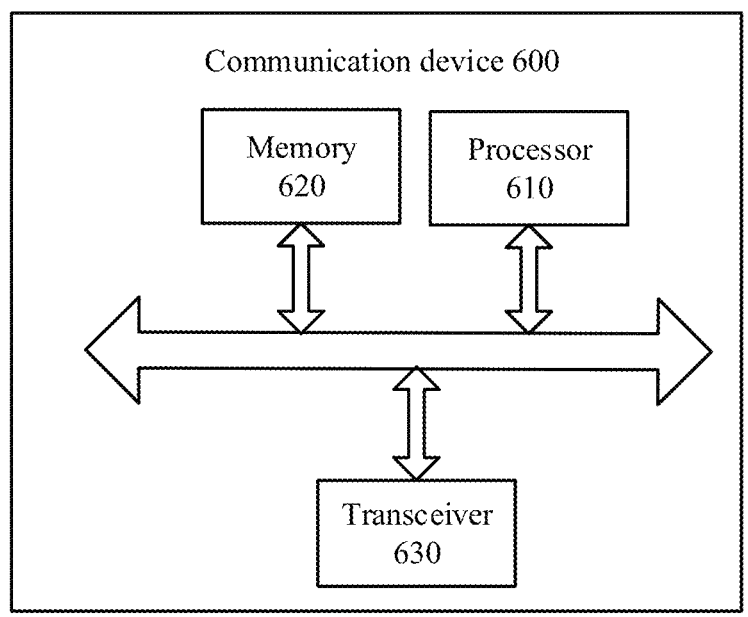
FIG. 6 is a schematic structural diagram of a communication device according to an embodiment of the present disclosure.

FIG. 6 is a schematic structural diagram of a communication device 600 according to an embodiment of the present disclosure. The communication device may be a terminal device or a network device. The communication device 600 shown in FIG. 6 includes a processor 610 that may invoke and execute a computer program from a memory to implement the method of the embodiments of the present disclosure.

Alternatively, as shown in FIG. 6, the communication device 600 may further include a memory 620. The processor 610 may invoke and execute a computer program from the memory 620 to implement the method of the embodiments of the present disclosure.

The memory 620 may be a separate device independent of the processor 610, or may be integrated into the processor 610.

Alternatively, as shown in FIG. 6, the communication device 600 may further include a transceiver 630 that may be controlled by the processor 610 to communicate with other devices, in particular sending information or data to other devices, or receiving information or data sent by other devices.

The transceiver 630 may include a transmitter and a receiver. The transceiver 630 may further include antennas. The number of antennas may be one or more.

Alternatively, the communication device 600 may be the network device of the embodiments of the disclosure, and the communication device 600 may implement the corresponding operations implemented by the network device in each method of the embodiments of the disclosure. For brevity, details are not described herein.

Alternatively, the communication device 600 may be the mobile terminal device/terminal device of the embodiments of the disclosure, and the communication device 600 may implement the corresponding operations implemented by the mobile terminal device/terminal device in each method of the embodiments of the disclosure. For brevity, details are not described herein.

Figure 7:
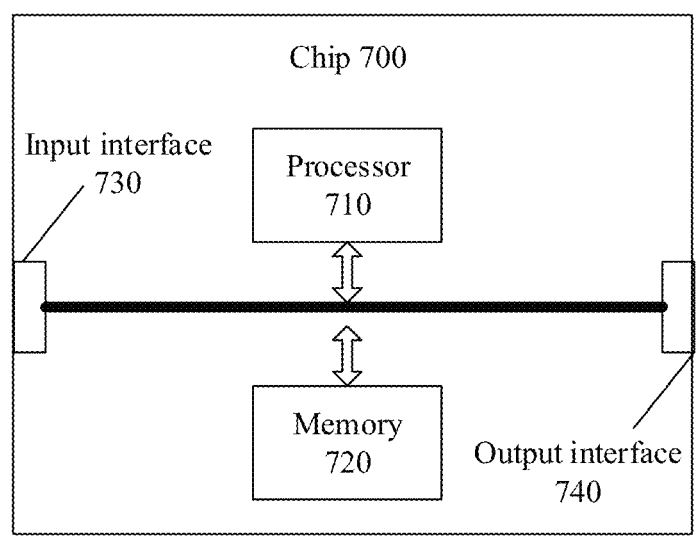
FIG. 7 is a schematic structural diagram of a chip according to an embodiment of the present disclosure.

FIG. 7 is a schematic structural diagram of a chip according to an embodiment of the present disclosure. The chip 700 shown in FIG. 7 includes a processor 710 that may invoke and execute a computer program from a memory to implement the method of the embodiments of the present disclosure.

Alternatively, as shown in FIG. 7, the chip 700 may further include a memory 720. The processor 710 may invoke and execute a computer program from the memory 720 to implement the method of the embodiments of the present disclosure.

The memory 720 may be a separate device independent of the processor 710, or may be integrated into the processor 710.

Alternatively, the chip 700 may further include an input interface 730. The processor 710 may control the input interface 730 to communicate with other devices or chips, and specifically, may obtain information or data transmitted by the other devices or chips.

Alternatively, the chip 700 may further include an output interface 740. The processor 710 may control the output interface 740 to communicate with other devices or chips, and specifically, may output information or data to other devices or chips.

Alternatively, the chip may be applied to the network device in the embodiments of the present disclosure, and the chip may implement the corresponding operations implemented by the network device in each method of the embodiments of the present disclosure. For brevity, details are not described herein.

Alternatively, the chip may be applied to the mobile terminal device/terminal device in the embodiments of the present disclosure, and the chip may implement the corresponding operations implemented by the mobile terminal device/terminal device in each method of the embodiments of the present disclosure. For brevity, details are not described herein.

It should be understood that the chip mentioned in the embodiments of the present disclosure may also be referred to as a system-level chip, a system chip, a chip system, or a system-on-chip.

Figure 8:
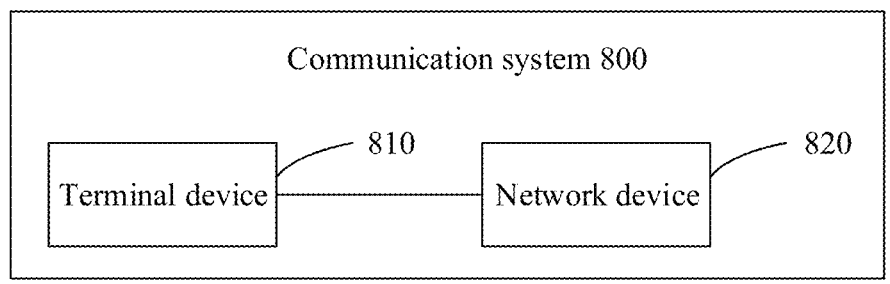
FIG. 8 is a schematic block diagram of a communication system according to an embodiment of the present disclosure.

FIG. 8 is a schematic block diagram of a communication system 800 according to an embodiment of the present disclosure. As shown in FIG. 8, the communication system 800 includes a terminal device 810 and a network device 820.

The terminal device 810 may be configured to implement a corresponding function implemented by the terminal device in the method described above, and the network device 820 may be configured to implement a corresponding function implemented by the network device in the method described above. For brevity, details are not described herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a programmable ROM (PROM), an Erasable PROM (EPROM), an Electrically EPROM (EEPROM) or a flash memory. The volatile memory may be a random access memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure further provides a computer-readable storage medium, which is configured to store a computer program.

Alternatively, the computer-readable storage medium may be applied to a network device in the embodiments of the disclosure, and the computer program enables a computer to execute corresponding operations implemented by the network device in each method of the embodiments of the disclosure. For simplicity, elaborations are omitted herein.

Alternatively, the computer-readable storage medium may be applied to a mobile terminal device/terminal device in the embodiments of the disclosure, and the computer program enables a computer to execute corresponding operations implemented by the mobile terminal device/terminal device in each method of the embodiments of the disclosure. For simplicity, elaborations are omitted herein.

An embodiment of the disclosure further provides a computer program product, which includes a computer program instruction.

Alternatively, the computer program product may be applied to a network device in the embodiments of the disclosure, and the computer program instruction enables a computer to execute corresponding operations implemented by the network device in each method of the embodiments of the disclosure. For simplicity, elaborations are omitted herein.

Alternatively, the computer program product may be applied to a mobile terminal device/terminal device in the embodiments of the disclosure, and the computer program instruction enables the computer to execute corresponding operations implemented by the mobile terminal device/terminal device in each method of the embodiments of the disclosure. For simplicity, elaborations are omitted herein.

An embodiment of the disclosure further provides a computer program.

Alternatively, the computer program may be applied to a network device in the embodiments of the disclosure, and the computer program runs in a computer to enable the computer to execute corresponding operations implemented by the network device in each method of the embodiments of the disclosure. For simplicity, elaborations are omitted herein.

Alternatively, the computer program may be applied to a mobile terminal device/terminal device in the embodiments of the disclosure, and the computer program runs in the computer to enable the computer to execute corresponding flows implemented by the mobile terminal device/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, coupling or direct coupling or communication connection between displayed or discussed components may be indirect coupling or communication connection implemented through some interfaces, the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The forgoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for resource coordination, comprising:
    sending, by a terminal device, a first request message to a network device to which a first subscriber identity card is connected, wherein the first request message is used to request the network device to configure or reserve a first resource, and the terminal device has the first subscriber identity card and a second subscriber identity card,
- wherein in response to that a cell in which the second subscriber identity card is located is handed over from a first cell to a second cell, the terminal device sends the first request message to the network device to which the first subscriber identity card is connected.

2. The method of claim 1, wherein the first resource is a first measurement interval, and the method further comprises:
- receiving, by the terminal device, configuration information of a first measurement interval mode sent by the network device, and determining, by the terminal device, the first measurement interval based on the configuration information of the first measurement interval mode, wherein the first measurement interval is used by the terminal device to perform Radio Resource Management (RRM) measurement and paging reception of a cell in which the second subscriber identity card is located.

3. The method of claim 2, wherein the configuration information of the first measurement interval mode comprises at least one of a period of the first measurement interval, a duration of the first measurement interval, or an offset of the first measurement interval.

4. The method of claim 1, wherein the first resource is at least one band or band group, the first request message carries first indication information, and the first indication information indicates the at least one band or band group.

5. The method of claim 4, wherein in response to that the network device uses the at least one band or band group, the method further comprises:
- receiving, by the terminal device, a Radio Resource Control (RRC) reconfiguration message sent by the network device, wherein the RRC reconfiguration message is used by the terminal device to release usage of the at least one band or band group.

6. The method of claim 1, wherein in response to that a cell in which the first subscriber identity card is located is handed over from a first cell to a second cell, the terminal device sends the first request message to the first cell, and the first request message is forwarded by the first cell to the second cell.

7. The method of claim 1, further comprising:
- in response to that no first response message sent by the network device responsive to the first request message is received by the terminal device before a first time, using, by the terminal device, the first resource for the second subscriber identity card.

8. The method of claim 7, wherein the first time is determined based on a first timer, and
- the terminal device starts the first timer after sending the first request message to the network device to which the first subscriber identity card is connected; and
- in response to that no first response message sent by the network device responsive to the first request message is received by the terminal device before the first timer expires, the terminal device uses the first resource for the second subscriber identity card.

9. The method of claim 7, wherein the first time is determined based on first time information for indicating at least one of a radio frame number, a subframe number, or a slot number,
- in response to that no first response message sent by the network device responsive to the first request message is received by the terminal device before the first time determined based on the first time information, the terminal device uses the first resource for the second subscriber identity card.

10. The method of claim 1, wherein the first subscriber identity card is in a connected state, and the second subscriber identity card is in an idle state or an inactive state or a connected state.

11. A method for resource coordination, comprising:
- sending, by a terminal device, a second request message to a network device to which a first subscriber identity card is connected, wherein the second request message is used to request the network device to lower a terminal device capability of the terminal device,
- wherein the second request message carries second indication information, and the second indication information indicates information about lowered terminal device capability of the terminal device or information about maximum terminal device capability of the terminal device under the network device,
- wherein the method further comprises:
- sending, by the terminal device, third indication information to the network device, wherein the third indication information is used to trigger the network device to initiate a terminal device capability request process;
- receiving, by the terminal device, a third request message sent by the network device, wherein the third request message is used to request the terminal device to report terminal device capability information; and
- sending, by the terminal device, the second indication information carrying the information about lowered terminal device capability or the information about maximum terminal device capability of the terminal device under the network device to the network device.

12. The method of claim 11, further comprising:
- sending, by the terminal device, the second indication information carrying the information about lowered terminal device capability or the information about maximum terminal device capability of the terminal device under the network device to the network device.

13. The method of claim 11, wherein the first subscriber identity card is in a connected state, and a second subscriber identity card is in an idle state or an inactive state or a connected state.

14. A device for resource coordination, comprising:
- a processor;
- a memory configured to store a computer program;
- an output interface; and
- an input interface,
- wherein the processor is configured to invoke and execute the computer program stored in the memory to control the output interface to send a first request message to a network device to which a first subscriber identity card is connected, wherein the first request message is used to request the network device to configure or reserve a first resource, and a terminal device has the first subscriber identity card and a second subscriber identity card,
- wherein in response to that a cell in which the second subscriber identity card is located is handed over from a first cell to a second cell, the processor is configured to invoke and execute the computer program stored in the memory to control the output interface to send the first request message to the network device to which the first subscriber identity card is connected.

15. The device of claim 14, wherein the first resource is a first measurement interval, and the processor is configured to invoke and execute the computer program stored in the memory to: control the input interface to receive configuration information of a first measurement interval mode sent by the network device, and determine the first measurement interval based on the configuration information of the first measurement interval mode, wherein the first measurement interval is used by the terminal device to perform Radio Resource Management (RRM) measurement and paging reception of a cell in which the second subscriber identity card is located, wherein the configuration information of the first measurement interval mode comprises at least one of a period of the first measurement interval, a duration of the first measurement interval, or an offset of the first measurement interval.

16. The device of claim 14, wherein the first resource is at least one band or band group, the first request message carries first indication information, and the first indication information indicates the at least one band or band group, wherein the processor is configured to invoke and execute the computer program stored in the memory to control the input interface to receive a Radio Resource Control (RRC) reconfiguration message sent by the network device, wherein the RRC reconfiguration message is used by the terminal device to release usage of the at least one band or band group.

17. The device of claim 14, wherein in response to that a cell in which the first subscriber identity card is located is handed over from a first cell to a second cell, the processor is configured to invoke and execute the computer program stored in the memory to control the output interface to send the first request message to the first cell, and the first request message is forwarded by the first cell to the second cell.

* * * * *